US008576443B2

(12) United States Patent
Tajima (10) Patent No.: US 8,576,443 B2
(45) Date of Patent: Nov. 5, 2013

(54) DEVICE, IMAGE FORMING APPARATUS, AND NON-TRANSISTORY COMPUTER READABLE MEDIUM FOR DISPLAYING AND EXECUTING A PERIODIC PROCESS (75) Inventor: Yukio Tajima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 334 days.

(21) Appl. No.: 13/030,426

(22) Filed: Feb. 18, 2011

(65) Prior Publication Data

US 2012/0062938 A1 Mar. 15, 2012

(30) Foreign Application Priority Data

Sep. 13, 2010 (JP) ................................ 2010-204467

(51) Int. Cl.
*G06F 3/12* (2006.01)
*G06F 15/00* (2006.01)
*G06K 1/00* (2006.01)

(52) U.S. Cl.
USPC .......................................... 358/1.9; 358/1.15

(58) Field of Classification Search
None
See application file for complete search history.

(56) References Cited

U.S. PATENT DOCUMENTS 7,318,040 B2 * 1/2008 Doss et al. ................... 705/7.16
7,640,551 B2 * 12/2009 Obert ............................ 719/318
2006/0252016 A1 * 11/2006 Terasawa ...................... 434/238
2007/0185933 A1 * 8/2007 Dao et al. ..................... 707/204
2008/0215628 A1 * 9/2008 Adachi et al. ............. 707/104.1
2008/0256008 A1 * 10/2008 Kwok .............................. 706/20
2009/0192861 A1 * 7/2009 Suzuki et al. ..................... 705/8
2012/0095961 A1 * 4/2012 Meyer et al. .................. 707/634

FOREIGN PATENT DOCUMENTS

| JP | 06-187351 A | 7/1994 |
| JP | 08-016086 A | 1/1996 |
| JP | 08-272854 A | 10/1996 |

* cited by examiner

*Primary Examiner* — Ming Hon
(74) *Attorney, Agent, or Firm* — Sughrue Mion, PLLC (57) ABSTRACT

A screen control device includes: a history storage unit that stores history information associating information on a process executed in an image forming apparatus with user information that identifies a user who executed the process; a periodic process determination unit that determines whether a process executed by the user is a periodic process executed periodically based on the history information; an execution schedule calculation unit that calculates, in a case where the process executed by the user is a periodic process, an execution scheduled date when the periodic process is executed next time; a periodic process management unit that manages the periodic process in association with the user and the calculated execution scheduled date; and a display controller that displays a screen that allows an execution of the periodic process on a display when the user uses the image forming apparatus during a given term including the execution scheduled date.

6 Claims, 11 Drawing Sheets

| JOB ID | START DATE | END DATE | USER ID | CATEGORY | DESTINATION/ SHEET FEEDER | NUMBER OF PAGES | NUMBER OF COPIES |
|---|---|---|---|---|---|---|---|
| 5421 | 2010.8.22 | 2010.8.22 | USR001 | PRINT | FEEDER 4 | 10 | 2 |
| 5422 | 2010.8.22 | 2010.8.22 | USR002 | NET TRANSFER | smb://192.168.1.2/smb | 4 | 1 |
| 5423 | 2010.8.22 | 2010.8.22 | USR003 | MAIL | fwd001@xxx.co.jp | 2 | 1 |
| 5424 | 2010.8.22 | 2010.8.22 | USR004 | FAX | 012-345-6789 | 5 | 1 |
| 5470 | 2010.8.22 | 2010.8.22 | USR005 | PRINT | FEEDER 4 | 3 | 2 |
| 5471 | 2010.8.29 | 2010.8.29 | USR003 | NET TRANSFER | smb://192.168.1.2/smb | 4 | 1 |
| 5472 | 2010.8.29 | 2010.8.29 | USR003 | MAIL | fwd001@xxx.co.jp | 2 | 1 |
| 5473 | 2010.8.29 | 2010.8.29 | USR003 | PRINT | FEEDER 4 | 5 | 1 |

FIG. 5A
EVENT MANAGEMENT TABLE

| EVENT ID | EXECUTION INTERVAL | PREVIOUS JOB ID | EXECUTION SCHEDULED DATE |
|---|---|---|---|
| 1 | 1 WEEK | 5472 | 2010/09/05 |
| 2 | 1 MONTH | 6400 | 2010/9/30 |
| 3 | 1 WEEK | 6587 | 2010/8/30 |
| ... | ... | ... | ... |

FIG. 5B
USER MANAGEMENT TABLE

| USER ID | EVENT ID |
|---|---|
| USR001 | 1,4,6 |
| USR003 | 2 |
| USR004 | - |
| USR005 | 3 |
| ... | ... |

| JOB ID | START DATE | END DATE | USER ID | CATEGORY | DESTINATION/ SHEET FEEDER | NUMBER OF PAGES | NUMBER OF COPIES |
|---|---|---|---|---|---|---|---|
| 5423 | 2010.8.22 | 2010.8.22 | USR003 | MAIL | fwd001@xxx.co.jp | 2 | 1 |
| 5472 | 2010.8.29 | 2010.8.29 | USR003 | MAIL | fwd001@xxx.co.jp | 2 | 1 |

FIG. 7B

| JOB ID | START DATE | END DATE | USER ID | CATEGORY | DESTINATION/ SHEET FEEDER | NUMBER OF PAGES | NUMBER OF COPIES |
|---|---|---|---|---|---|---|---|
| 5423 | 2010.8.23 | 2010.8.22 | USR003 | MAIL | fwd001@xxx.co.jp | 2 | 1 |
| 5472 | 2010.8.28 | 2010.8.29 | USR003 | MAIL | fwd001@xxx.co.jp | 2 | 1 |

! YOU HAVE JOB SCHEDULED TODAY

| CATEGORY | PREVIOUS EXECUTION DATE | DESTINATION |
|---|---|---|
| MAIL | 2010/8/29 | |
| FAX | 2010/7/31 | 011-111-1111 |

RETURN TO MENU

SEND MAIL

| RESOLUTION | 200dpi |
|---|---|
| COLOR MODE | FULL COLOR |
| DOCUMENT SIZE | A4 |
| DESTINATION | Fwd001@xxx.co.jp |
| FILE TYPE | PDF |

RETURN TO MENU | SEND

FIG. 11A

| USER ID | EVENT ID | EXECUTION INTERVAL | PREVIOUS JOB ID | EXECUTION SCHEDULED DATE |
|---|---|---|---|---|
| USR001 | 1 | 1 WEEK | 5433 | 2010/09/18 |
| | 4 | 2 WEEKS | 5455 | 2010/09/20 |
| | 6 | 1 MONTH | 5498 | 2010/10/01 |
| USR003 | 2 | 1 WEEK | 5501 | 2010/09/12 |
| USR004 | - | - | - | - |
| USR005 | 3 | 1 MONTH | 5425 | 2010/10/10 |
| ... | ... | ... | ... | ... |

FIG. 11B

| USER ID | EVENT ID | EXECUTION INTERVAL | CATEGORY | DESTINATION | NUMBER OF PAGES | NUMBER OF COPIES | NEXT EXECUTION SCHEDULED DATE |
|---|---|---|---|---|---|---|---|
| USR001 | 1 | 1 WEEK | PRINT | FEEDER 4 | 10 | 1 | 2010/09/18 |
| | 4 | 2 WEEKS | COPY | FEEDER 4 | 5 | 2 | 2010/09/20 |
| | 6 | 1 MONTH | PRINT | FEEDER 4 | 3 | 10 | 2010/10/01 |
| USR003 | 2 | 1 WEEK | MAIL | Fwd001@xxx.co.jp | 2 | 1 | 2010/09/12 |
| USR004 | - | - | - | - | - | - | - |
| USR005 | 3 | 1 MONTH | PRINT | FEEDER 4 | 10 | 1 | 2010/10/10 |
| ... | ... | ... | ... | ... | ... | ... | ... |

DEVICE, IMAGE FORMING APPARATUS, AND NON-TRANSISTORY COMPUTER READABLE MEDIUM FOR DISPLAYING AND EXECUTING A PERIODIC PROCESS

CROSS-REFERENCE TO RELATED APPLICATION

This application is based on and claims priority under 35 USC 119 from Japanese Patent Application No. 2010-204467 filed on Sep. 13, 2010.

BACKGROUND (i) Technical Field

The present invention relates to a screen control device, an image forming apparatus, and a computer readable medium.

(ii) Related Art

There are routine tasks executed periodically (e.g. weekly, monthly) in companies and the like. Routine tasks include tasks using an image forming apparatus. Recently, as multiple functions and highly-functions are incorporated in an image forming apparatus, a number of buttons to receive various settings are located on an operation screen that receives instructions to the image forming apparatus from the user. This makes the operation to the image forming apparatus, which a user needs to carry out to perform routine tasks using an image forming apparatus, complicated and cumbersome.

SUMMARY

According to an aspect of the present invention, there is provided a screen control device including: a history storage unit that stores history information associating information on a content of a process executed in an image forming apparatus with user information that identifies a user who executed the process; a periodic process determination unit configured to determine whether a process executed by the user is a periodic process executed periodically on a basis of the history information; an execution schedule calculation unit configured to calculate, in a case where it is determined that the process executed by the user is a periodic process, an execution scheduled date when the periodic process is executed next time; a periodic process management unit configured to manage the periodic process in association with the user and the calculated execution scheduled date; and a display controller configured to display a screen that allows an execution of the periodic process on a display when the user uses the image forming apparatus during a given term including the execution scheduled date.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of exemplary embodiments of the present invention.

Figure 1:
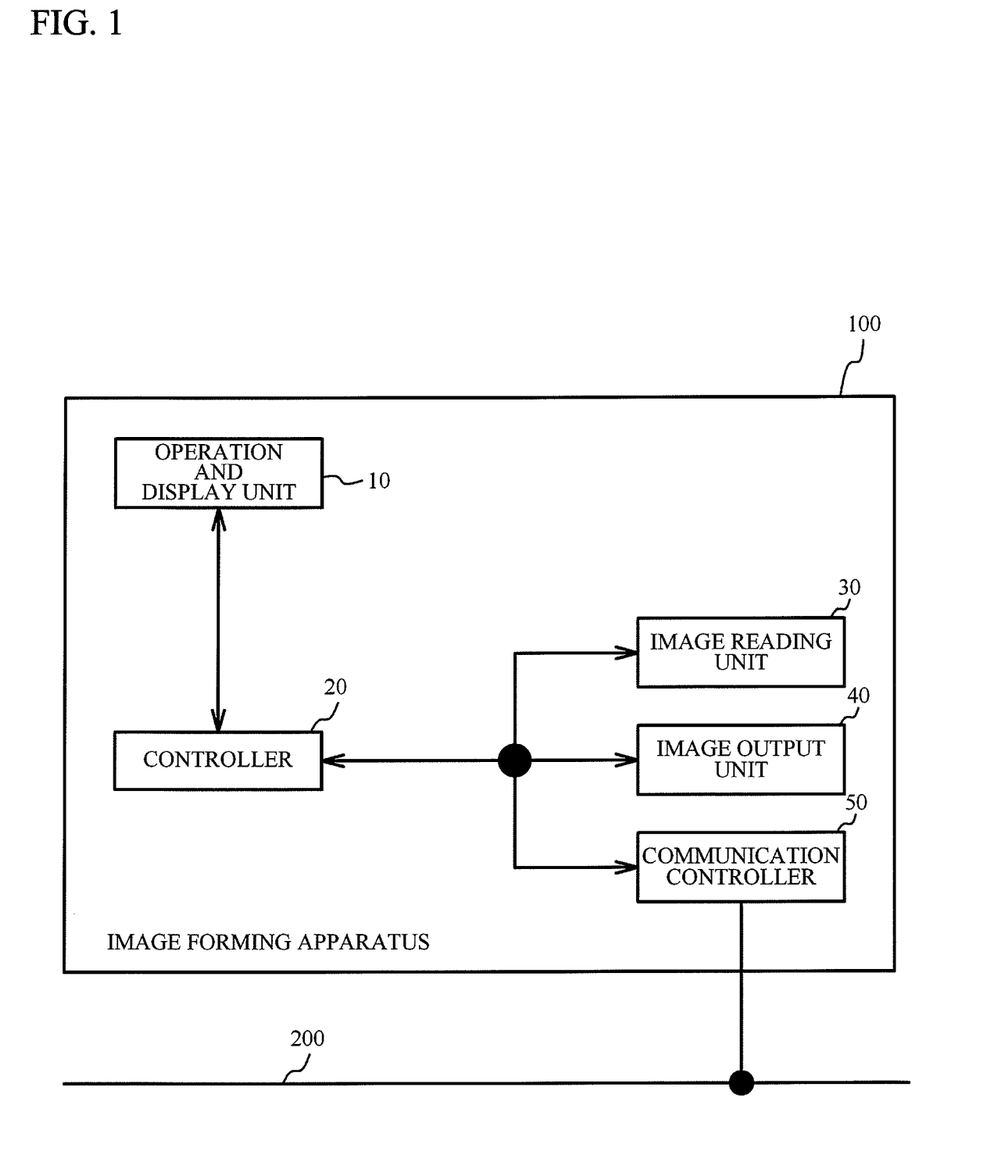
FIG. 1 is a diagram illustrating a composition of an image forming apparatus to which the present invention is applied.

FIG. 1 is a diagram illustrating a composition of an image forming apparatus to which the present invention is applied. An image forming apparatus 100 is provided with an operation and display unit 10, a controller 20, an image reading unit 30, an image output unit 40 and a communication controller 50. A printer, a copier, a facsimile machine, and a complex machine which has at least two of multiple functions such as print, copy, facsimile transmission and the like may be the image forming apparatus 100. The operation and display unit 10 is an example of a display, and the controller 20 is an example of a screen control device.

The operation and display unit 10 displays an operation screen to receive an operational input to the image forming apparatus 100 from a user based on the control by the controller 20. The operation and display unit 10 receives instructions to the image forming apparatus 100 from a user through the operation screen. The operation and display unit 10 outputs instruction information, which is received from the user through the operation screen, to the controller 20.

The controller 20 controls whole operation of the image forming apparatus 100. More specifically, the controller 20 controls the operation and display unit 10 to display the operation screen on the operation and display unit 10. In addition, the controller 20 receives instruction information to the image forming apparatus from the operation and display unit 10.

The controller 20 controls the image reading unit 30, the image output unit 40, and the communication controller 50, which are provided to the image forming apparatus 100, according to received instruction information. For example, when the instruction information to order the scan of image is received from the operation and display unit 10, the controller 20 controls the image reading unit 30 to scan an original document located on a platen and acquire an image of the original document. Moreover, when instruction information to order a copy is received from the operation and display unit 10, the controller 20 controls the image reading unit 30 to scan an original document located on a platen, and acquire the image of the original document. Then, the controller 20 controls the image output unit 40 to form the acquired image of the original document on a recording medium such as paper and output it.

When instruction information to order a scan-transfer is received from the operation and display unit 10, the controller 20 controls the image reading unit 30 to scan an original document located on a platen and acquire an image of the original document. Then, the controller 20 controls the communication controller 50 to transmit the acquired image of the original document to an information processing apparatus (not illustrated). When instruction information to order the FAX transmission is received from the operation and display unit 10, the controller 20 controls the image reading unit 30 to scan a document to be transmitted located on a platen and acquire the document image. Then, the controller 20 controls the communication controller 50 to transmit the acquired document image to a destination specified through the operation and display unit 10.

When instruction information to order a print of image data is received from the communication controller 50, the controller 20 controls the image output unit 40 to form the image based on the image data received from the communication controller 50 and outputs it.

The image reading unit 30 is a scanner for example, and reads an original document located on a platen according to the control by the controller 20, and outputs the read image of the original document to the controller 20.

The image output unit 40 forms the image on the recording medium such as paper and outputs it according to the control by the controller 20.

The communication controller 50 transmits the document image to be transmitted to the destination specified through the operation and display unit 10 according to the control by the controller 20. In addition, the communication controller 50 receives a print instruction from an information processing apparatus (not illustrated) coupled to the image forming apparatus 100 via communication means 200. The communication controller 50 outputs the received print instruction to the controller 20.

Figure 2:
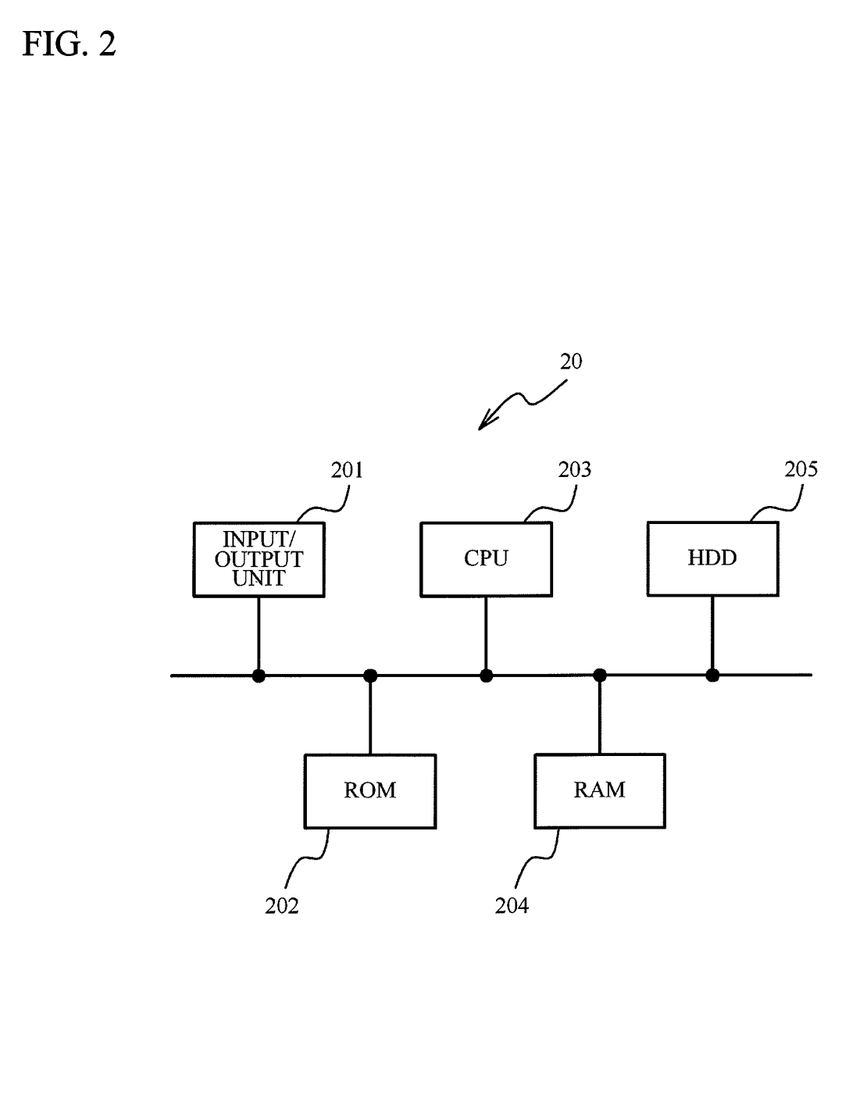
FIG. 2 is a diagram illustrating a hardware structure of a controller.

A description will now be given of a hardware structure of the controller 20. FIG. 2 is a diagram illustrating a hardware structure of the controller 20.

The controller 20 is provided with an input/output unit 201, a ROM (Read Only Memory) 202, a CPU (Central Processing Unit) 203, a RAM (Random Access Memory) 204, and an HDD (Hard Disk Drive) 205.

The input/output unit 201 transmits/receives data to/from the operation and display unit 10, the image reading unit 30, the image output unit 40, and the communication controller 50. The ROM 202 stores programs for determining the process executed periodically in the image forming apparatus 100. The CPU 203 reads and executes programs stored in the ROM 202. The RAM 204 stores temporary data used during the execution of programs. The HDD 205 stores history information of processes executed by the image forming apparatus 100, and information of periodic process of each user and the like.

Figure 3:
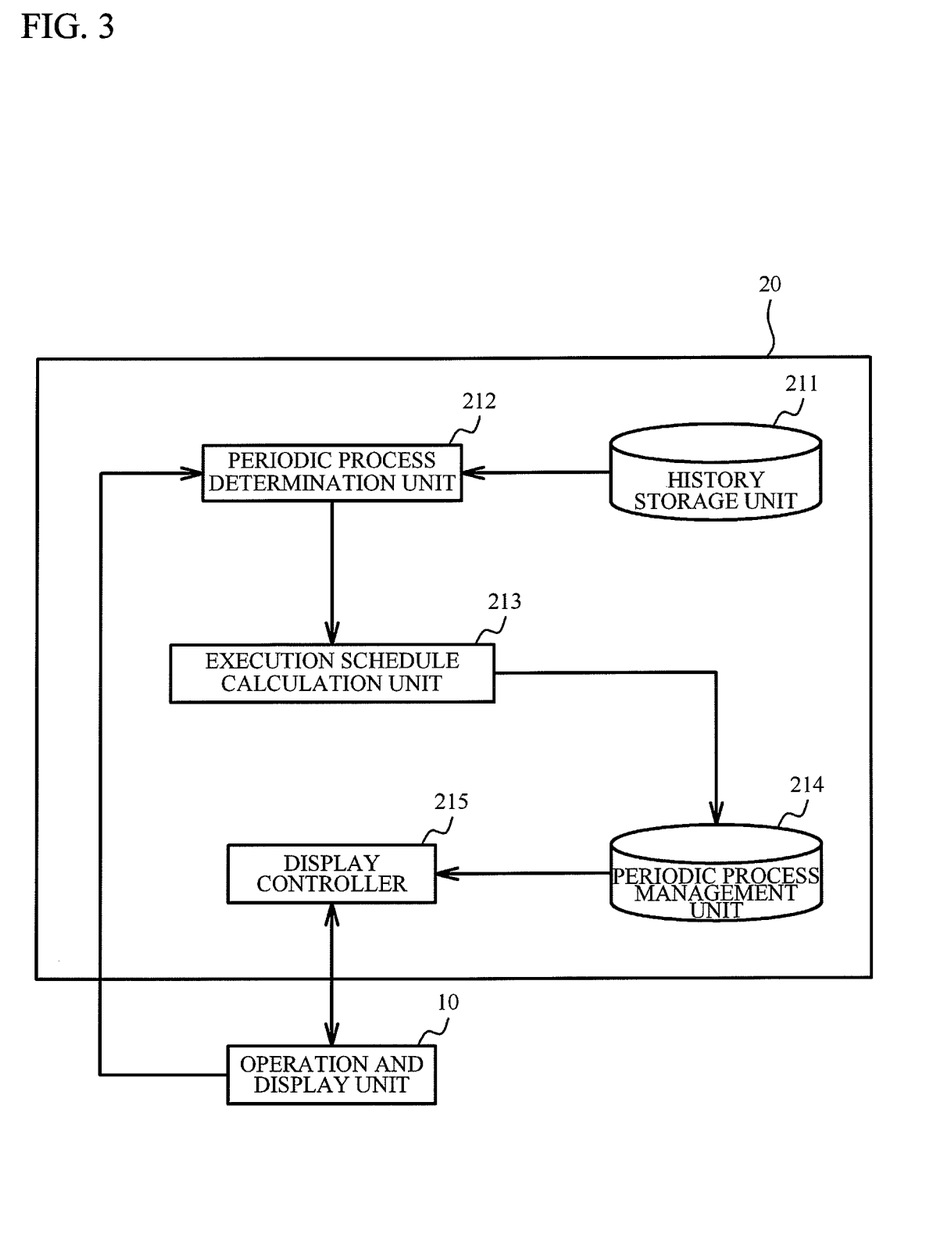
FIG. 3 is a functional block diagram illustrating functions provided to the controller.

A description will now be given of functions provided to the controller 20. FIG. 3 is a functional block diagram illustrating functions provided to the controller 20. The controller 20 is provided with a history storage unit 211, a periodic process determination unit 212, an execution schedule calculation unit 213, a periodic process management unit 214 and a display controller 215. The history storage unit 211 and the periodic process management unit 214 are the HDD 205 for example. The periodic process determination unit 212, the execution schedule calculation unit 213, and the display controller 215 are achieved by the execution of programs stored in the ROM 202 by the CPU 203.

The history storage unit 211 stores history information of processes executed by the image forming apparatus 100. Here, a description will be given of an example of history information stored in the history storage unit 211 with reference to FIG. 4.

Figure 4:
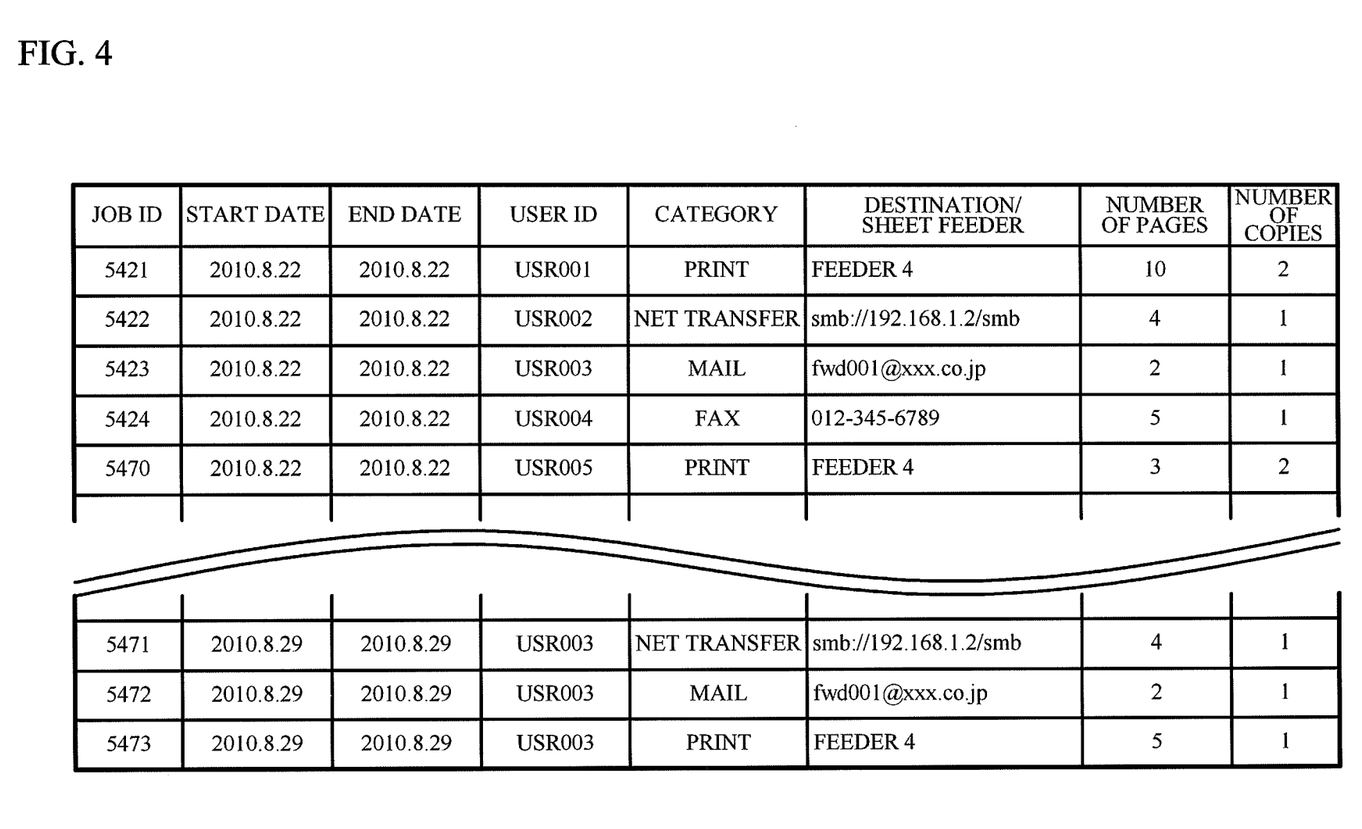
FIG. 4 is a diagram illustrating history information stored in a history storage unit.

FIG. 4 is a diagram illustrating history information stored in the history storage unit 211. In this exemplary embodiment, the history information includes "job ID", "start date", "end date", "user ID", "category", "destination/sheet feeder", "number of pages" and "number of copies" as items.

The item "job ID" stores numbers automatically given to processes executed by the image forming apparatus 100. The item "start date" represents the date when the process identified by the "job ID" started. The item "end date" represents the date when the process identified by the "job ID" ended. The item "user ID" represents information that identifies a user who executed the process identified by the "job ID" and is an example of user information.

The item "category" represents the category of the process identified by the "job ID". In the item "category", 'print' represents a printing process, and 'net transfer' represents a process that transfers an image read by the image reading unit 30 to an information processing apparatus coupled to the image forming apparatus 100 via the communication means 200. Moreover, 'mail' represents the process that sends a mail to which an image data of image read by the image reading unit 30 is attached, and 'FAX' represents a process that executes a facsimile transmission of the image read by the image reading unit 30 to the destination.

When the "category" is 'print' or 'copy', information of a feeder which supplied sheets is stored in the item "destination/sheet feeder". When the "category" is 'net transfer', 'mail' or 'fax', information of the destination to which the image read by the image reading unit 30 is transmitted is stored in the item "destination/sheet feeder". The number of pages of data processed in the process identified by the "job ID" is stored in the item "number of pages". The number of copies of print, copy, net transfer or facsimile transmission is stored in the item "number of copies".

Back to FIG. 3, a description will be continued. The periodic process determination unit 212 determines a periodic process executed periodically based on the history information stored in the history storage unit 211 with respect to each user. More specifically, the periodic process determination unit 212 acquires the history information from the history storage unit 211 after the execution of the process instructed to the image forming apparatus 100 through the operation and display unit 10. Then, the periodic process determination unit 212 determines whether the process instructed by the user is executed periodically. When the process instructed by the user is executed periodically, the periodic process determination unit 212 determines that the process instructed by the user is the periodic process. The periodic process determination unit 212 outputs information on the periodic process to the execution schedule calculation unit 213, and the information on the periodic process includes a user ID of the user who executes the determined periodic process, and the interval at which the periodic process is executed.

The execution schedule calculation unit 213 receives the information on the periodic process, which includes a user ID of the user who executes the periodic process and the interval at which the periodic process is executed, from the periodic process determination unit 212. The execution schedule calculation unit 213 calculates an execution scheduled date when the received periodic process is executed next time based on information received from the periodic process determination unit 212. Then the execution schedule calculation unit 213 stores the user ID, the periodic process executed by the user identified by the user ID, and the date when the periodic process might be executed next time in the periodic process management unit 214, and associates them each other.

The periodic process management unit 214 manages a periodic process executed by a user in association with next execution schedule of the periodic process with respect to each user. More specifically, the periodic process management unit 214 stores an event management table illustrated in FIG. 5A and a user management table illustrated in FIG. 5B.

Figure 5A:
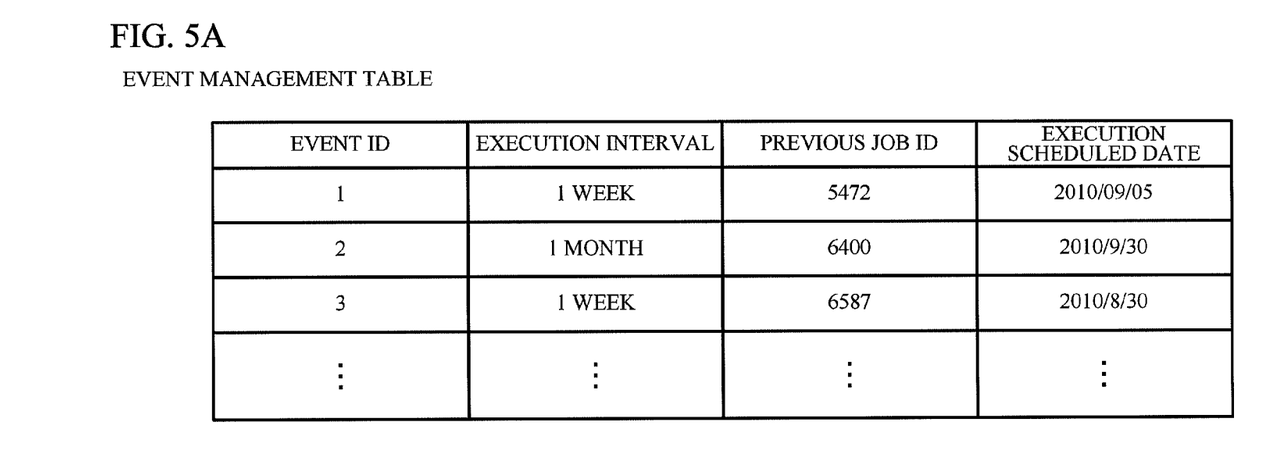
FIGS. 5A and 5B are diagrams illustrating information stored in a periodic process management unit.

The event management table includes items "event ID", "execution interval", "previous job ID" and "execution scheduled date". The "event ID" is an identification number to identify the periodic process. The "execution interval" represents an interval at which the periodic process identified by the "event ID" is executed. The "previous job ID" stores the number given to the last executed process of the periodic process identified by the "event ID". The "execution scheduled date" stores the scheduled date when the periodic process identified by the event ID is executed next time.

Figure 5B:
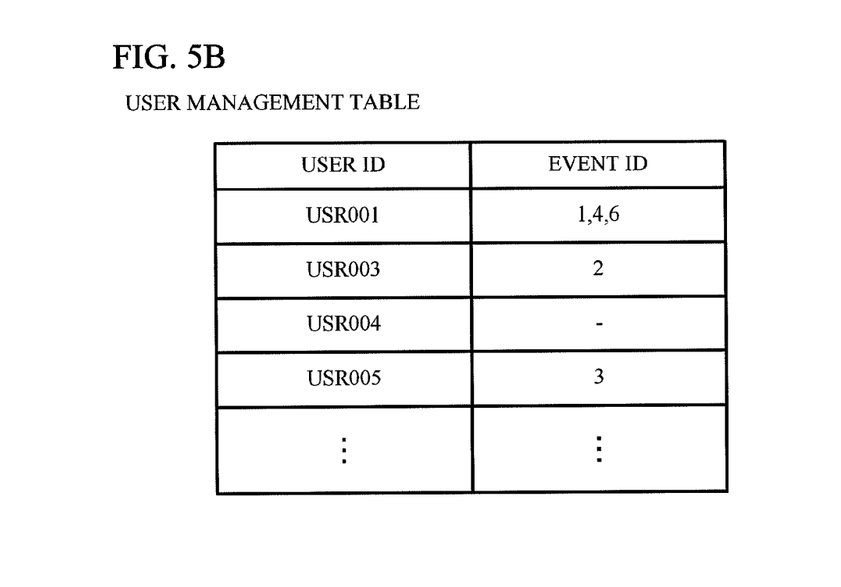

The user management table illustrated in FIG. 5B includes items "user ID" and "event ID". The "user ID" is information to identify a user of the image forming apparatus 100. The "event ID" stores an event ID identifying the periodic process associated with the user identified by the user ID. That is to say that the user management table manages data indicating which periodic process of periodic processes registered in the event management table the user identified by the user ID executes.

For example, in the user management table illustrated in FIG. 5B, the event ID associated with the user ID "USR003" is "2". This means that the periodic process that the user identified by the user ID "USR003" executes is a process identified by the event ID "2" in the event management table illustrated in FIG. 5A. In this case, according to FIG. 5A, it is determined that the user identified by the user ID "USR003" executes the periodic process identified by the event ID "2" at 1-month intervals, and the next execution scheduled date is Sep. 30, 2010. As described above, the periodic process management unit 214 manages the periodic process executed periodically by the user in association with the execution scheduled date when the periodic process is planned to be executed next time with respect to each user.

The display controller 215 acquires a user ID of a user who uses the image forming apparatus 100 from the operation and display unit 10. The display controller 215 refers to the user management table in the periodic process management unit 214, and determines whether the periodic process associated with the acquired user ID exists. When the periodic process associated with the acquired user ID exists, the display controller 215 refers to the event management table. When the current date is within the given term including the execution scheduled date, the display controller 215 displays the periodic process execution proposal screen, which receives the execution of the periodic process, on the operation and display unit 10.

Figure 6:
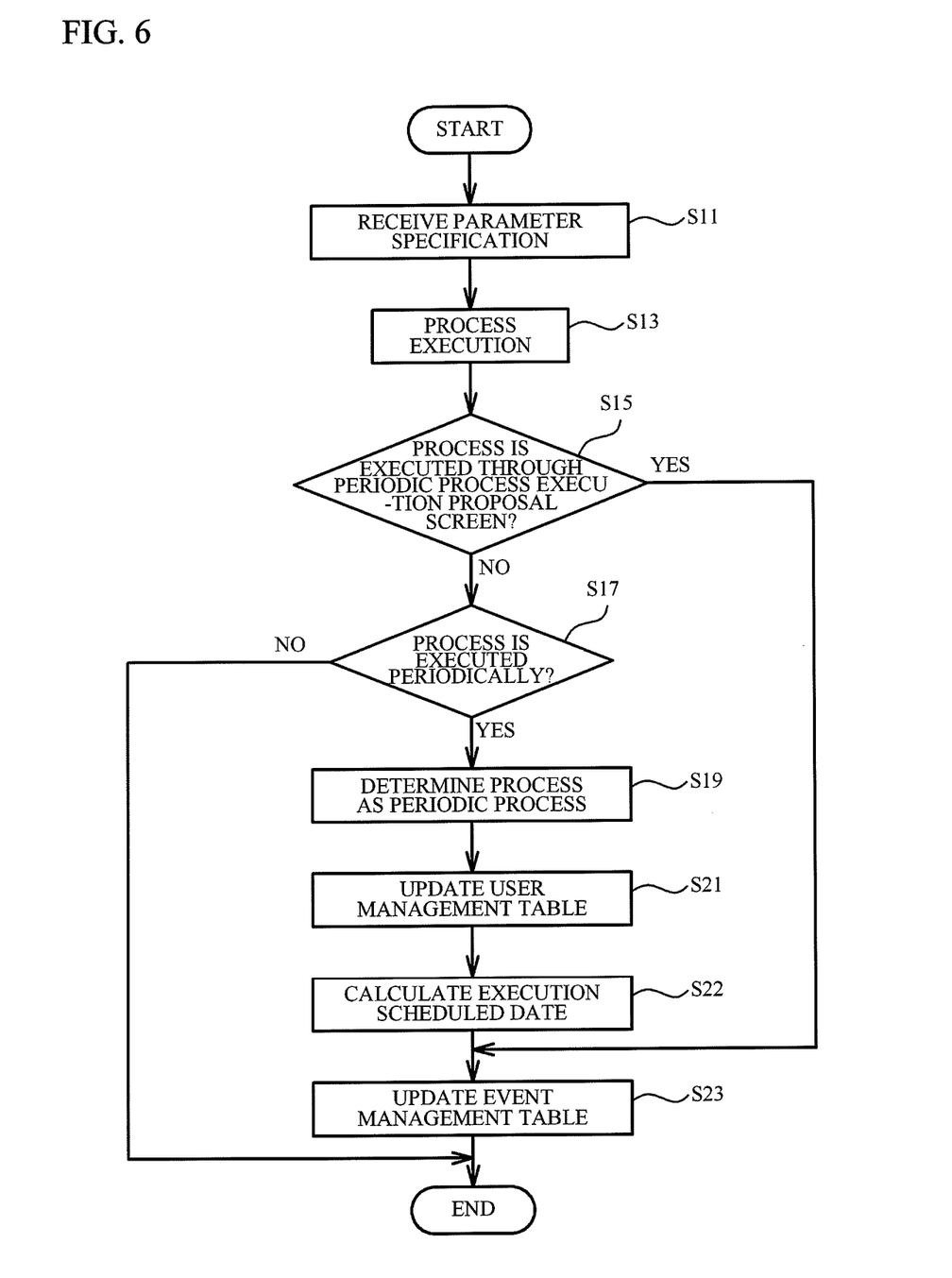
FIG. 6 is a flowchart illustrating a process executed by a controller.

A description will now be given of the process executed by the controller 20. FIG. 6 is a flowchart illustrating a process executed by the controller 20.

The operation and display unit 10 receives the parameter specification (the settings), with which the process using the image forming apparatus 100 is executed, from the user (step S11). Then, the image reading unit 30, the image output unit 40, or the communication controller 50 executes the specified process based on the parameters specified in the step S11 according to the control of the controller 20 (step S13).

Then, the periodic process determination unit 212 determines whether the process executed in the step S13 is executed through the periodic process execution proposal screen (step S15). Here, the periodic process execution proposal screen is a screen on which the display controller 215 proposes the execution of the periodic process associated with the user.

When the process executed in the step S13 is executed through the periodic process execution proposal screen (step S15/YES), the execution schedule calculation unit 213 updates the event management table stored in the periodic process management unit 214 (step S23). More specifically, the periodic process management unit 214 updates the "previous job ID" in the event management table with the job ID which was given to the process executed through the periodic process execution proposal screen this time (the process executed in the step S13).

Figure 7A:
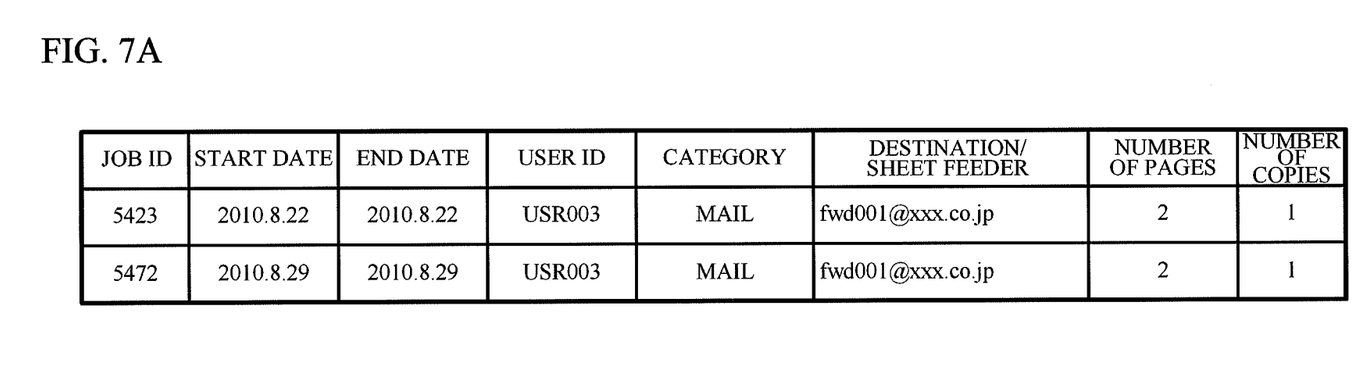
FIGS. 7A and 7B are diagrams for explaining a process of determining a periodic process.

When the process executed in the step S13 is not executed through the periodic process execution proposal screen (step S15/NO), the periodic process determination unit 212 determines whether the process executed in the step S13 is executed periodically (step S17). More specifically, the periodic process determination unit 212 extracts records of which values of items "user ID", "category", and "destination/sheet feeder" are same as those of the process executed in the step S13 from the history information illustrated in FIG. 4 for example. For example, assume that the "user ID", the "category" and the "destination/sheet feeder" of the process executed in the step S13 are 'USR003', 'mail' and 'fwd001@xxx.co.jp' respectively. In this case, the periodic process determination unit 212 extracts records identified by job IDs "5423" and "5472" of which values of items "user ID", "category" and "destination/sheet feeder" are same as those of the process being executed this time from the history information in FIG. 4 as illustrated in FIG. 7A.

Then, the periodic process determination unit 212 determines whether the start date of each extracted process has periodicity. For example, assume that the date when the execution of the procedure of the step S13 is started is Sep. 5, 2010. Here, the process identified by the job ID "5472" was executed on Aug. 29, 2010 which is 1 week before Sep. 5, 2010 as illustrated in FIG. 7A. In addition, the process identified by the job ID "5423" was executed on Aug. 22, 2010 which is 2 weeks before Sep. 5, 2010. That is to say that the process executed in the step S13 is executed at 1-week intervals. In this case, as the start date of each extracted process has periodicity, the periodic process determination unit 212 determines that the process executed in the step S13 is a periodic process. The periodic process determination unit 212 may use the end date to determine the periodicity.

Figure 7B:
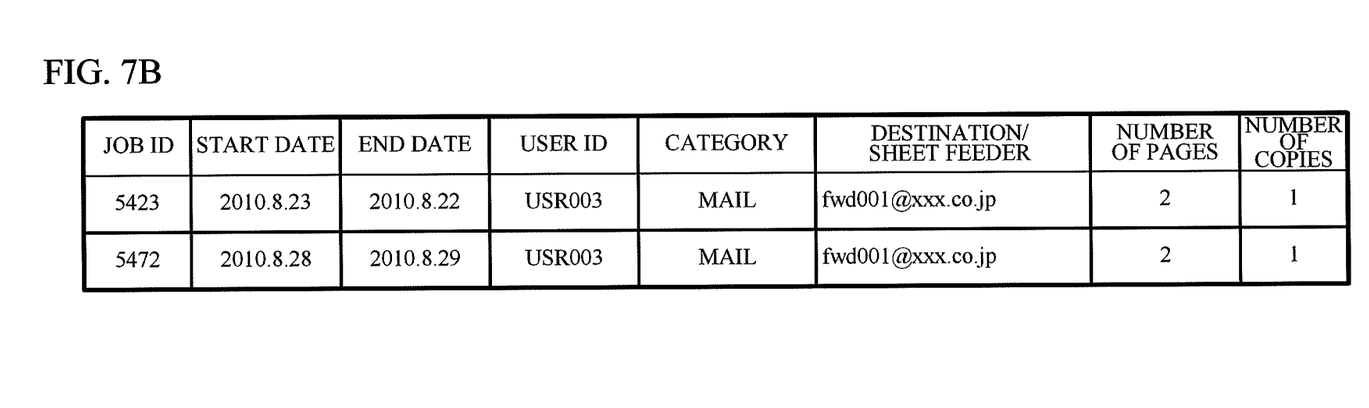

When each process is determined to be executed at almost same intervals, the periodic process determination unit 212 may determine that the process has periodicity. That is to say that the periodic process determination unit 212 may set a certain range (±N days) to the intervals at which each process is executed, and determine whether the process has periodicity. For example, assume that the process identified by the job ID "5472" was executed 8 days before the process executed this time, and that the process identified by the job ID "5423" was executed 5 days before the process identified by the job ID "5472", as illustrated in FIG. 7B. In this case, each process is executed at 1-week (plus or minus two days) intervals. Thus, as each process is determined to be executed at almost 1-week intervals, the periodic process determination unit 212 determines that the process has periodicity. In this case, the periodic process determination unit 212 may calculate the execution interval of the periodic process from the average of execution intervals between processes. In the above example, the interval between the execution of the process this time and the execution of the process previous time is 8 days, and the interval between the execution of the process previous time and the execution of the process before previous time is 5 days. In this case, 7 days (1 week), which is the value calculated by rounding off the average value (6.5 days) of 8 days and 5 days, is calculated as an execution interval of the periodic process.

The determination method of periodicity is not limited to above method.

When it is determined that the process executed in the step S13 is executed periodically (step S17/YES), the periodic process determination unit 212 determines that the process executed in the step S13 is the periodic process (step S19). The periodic process determination unit 212 updates the user management table (step S21). More specifically, the periodic process determination unit 212 gives the event ID to the periodic process, and associates the user ID with the event ID in the user management table.

Then, the execution schedule calculation unit 213 calculates the scheduled date when the process which is determined to be the periodic process in the step S19 is executed next time (step S22). More specifically, the scheduled date when the periodic process is executed next time is calculated based on the date when the process of the step S13 was started and the execution interval calculated in the step S17 by the periodic process determination unit 212.

The execution schedule calculation unit 213 updates the event management table (step S23), and ends this process. More specifically, the execution schedule calculation unit 213 updates the execution interval, the previous job ID and the execution scheduled date of the event ID added in the step S21. The execution schedule calculation unit 213 stores the execution interval used for calculating the execution scheduled date in the "execution interval". The execution schedule calculation unit 213 stores the job ID given to the process executed in the step S13 in the "previous job ID". The execution schedule calculation unit 213 stores the execution scheduled date calculated in the step S22 in the "execution scheduled date".

When it is determined that the process executed in the step S13 is not executed periodically (step S17/NO), the periodic process determination unit 212 ends this process.

Figure 8:
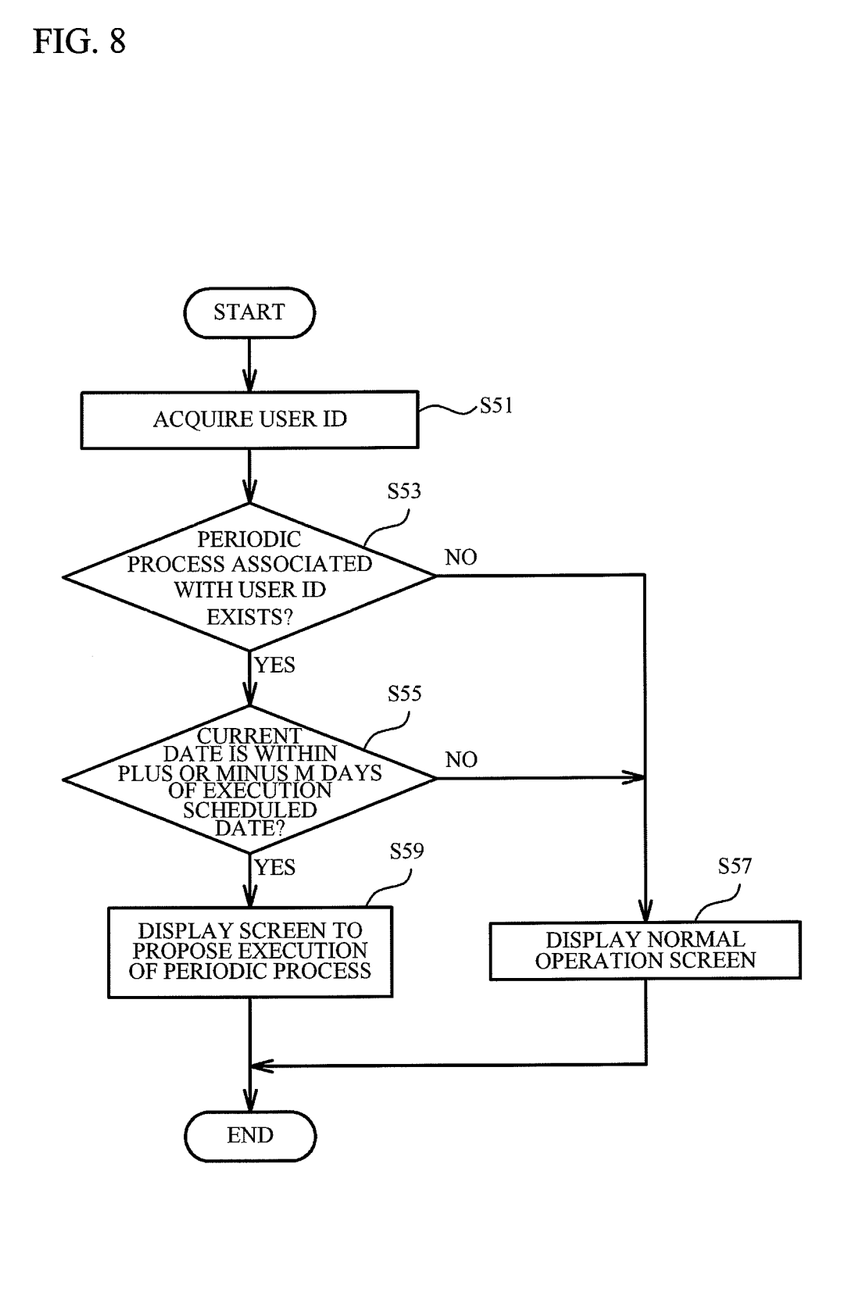
FIG. 8 is a diagram illustrating a process executed by a display controller.

A description will now be given of the process of presenting the periodic process execution proposal screen to the user. FIG. 8 is a flowchart illustrating a process where the display controller 215 presents the periodic process execution proposal screen to the user.

The display controller 215 acquires the user ID of the user who starts using the image forming apparatus 100 from the operation and display unit 10 (step S51). The user ID is an example of user information. The display controller 215 determines whether the periodic process associated with the user ID exists (step S53). When the periodic process associated with the user ID does not exist (step S53/NO), the display controller 215 displays a normal operation screen illustrated in FIG. 9 on the operation and display unit 10 for example (step S57), and ends the process.

When the periodic process associated with the user ID exists (step S53/YES), the display controller 215 determines whether the current date is within plus or minus M days (M is a given arbitrary number) of the execution scheduled date of the periodic process associated with the user ID (step S55).

Figure 9:
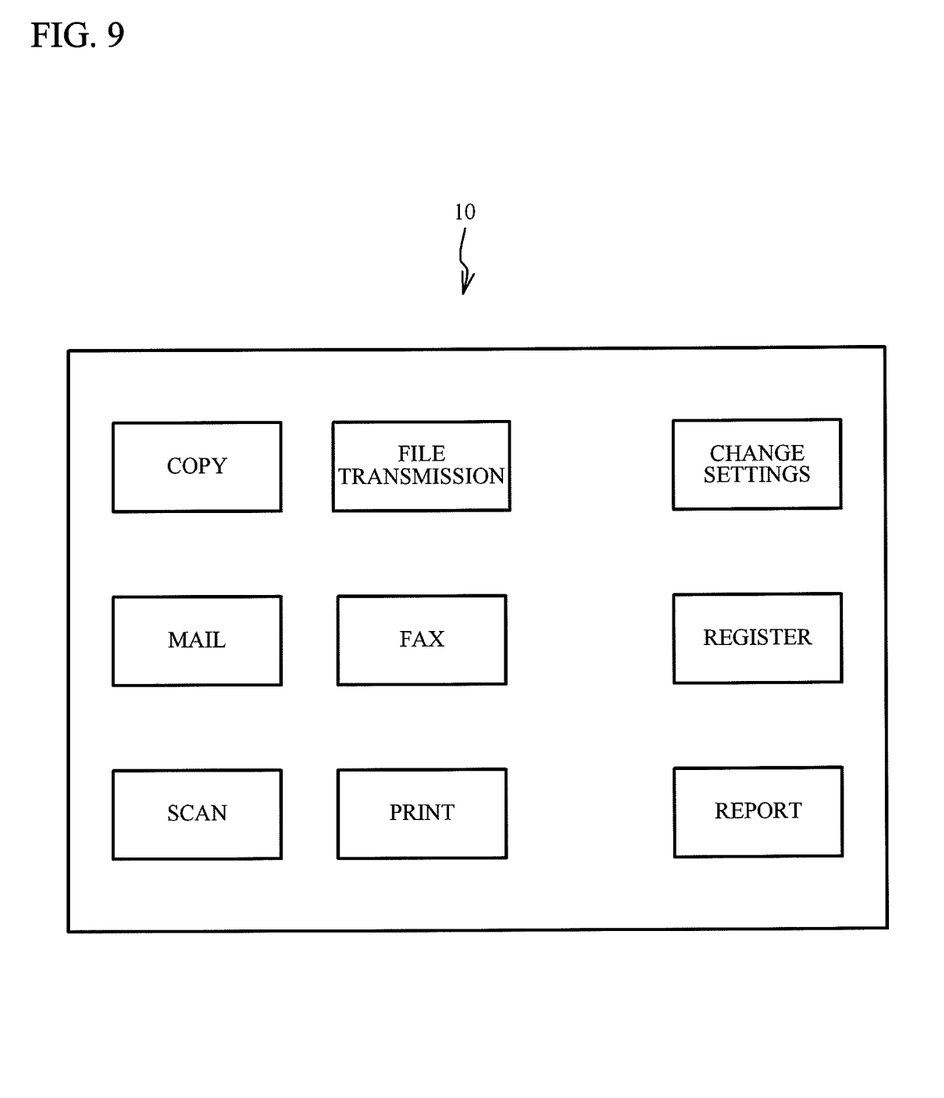
FIG. 9 is a diagram illustrating a normal operation screen displayed on an operation and display unit.

When the current date is not within plus or minus M days of the execution scheduled date of the periodic process associated with the user ID (step S55/NO), the display controller 215 displays a normal operation screen illustrated in FIG. 9 on the operation and display unit 10 for example (step S57), and ends the process.

Figure 10A:
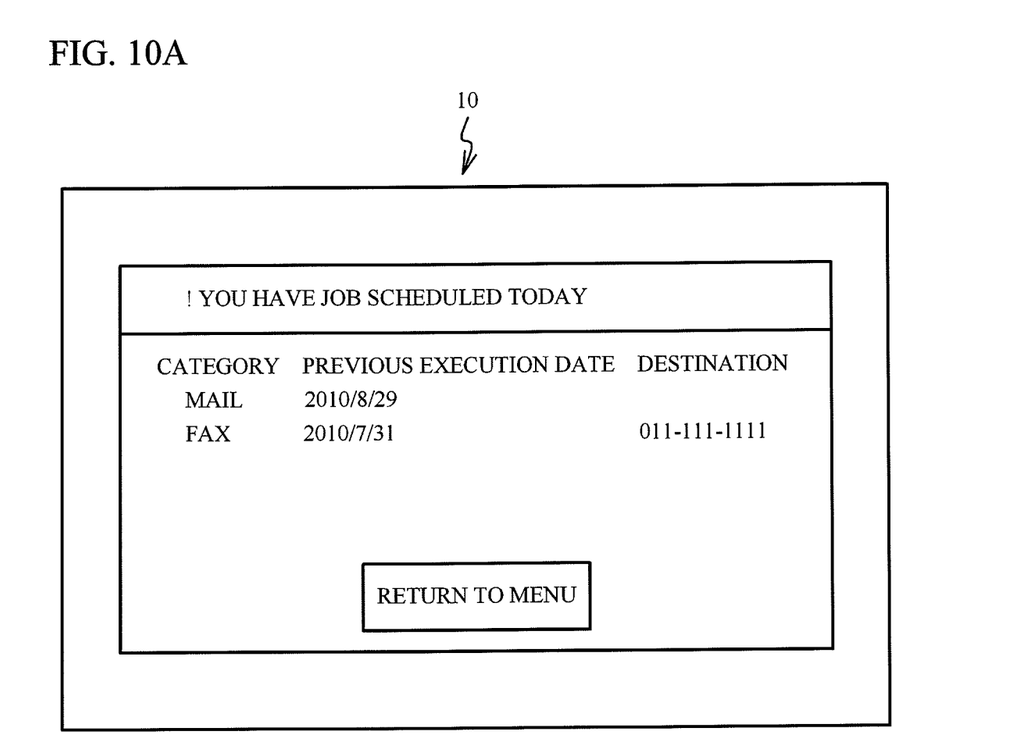
FIGS. 10A and 10B are diagrams illustrating a periodic process execution proposal screen displayed on the operation and display unit.
Figure 10B:
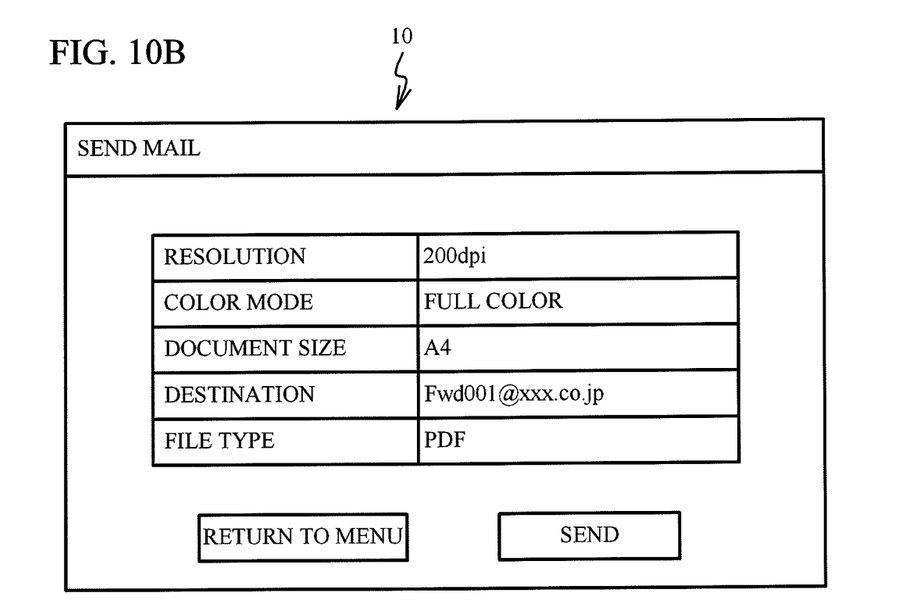

When the current date is within plus or minus M days of the execution scheduled date of the periodic process associated with the user ID (step S55/YES), the display controller 215 displays the periodic process execution proposal screen, which proposes the execution of the periodic process, on the operation and display unit 10 (step S59), and ends the process. For example, the display controller 215 displays the screen illustrated in FIG. 10A over the normal screen display illustrated in FIG. 9. In FIG. 10A, the mail transmission and a facsimile transmission are displayed as periodic processes (jobs) of which the execution is scheduled. Here, when the "mail" is selected from jobs illustrated in FIG. 10A, a screen for executing the mail transmission is displayed as illustrated in FIG. 10B. The setting information displayed in FIG. 10B is based on the setting information set in the process identified by the "previous job ID". The setting information set in the process identified "previous job ID" is acquired from the history information. That is to say, the content (the setting information) of the periodic process is determined based on the history information. In FIG. 10A, when a button "return to menu" is selected, the normal operation screen illustrated in FIG. 9 is displayed.

As clear from above description, according to the above exemplary embodiment, the history storage unit 211 stores the history information that associates information relating to a process executed in the image forming apparatus 100 such as an execution start date with a user ID identifying a user who executed the process, and the periodic process determination unit 212 determines whether the process executed this time is the periodic process, which is executed periodically, with respect to each user based on the history information. The execution schedule calculation unit 213 calculates the scheduled date when the periodic process is executed next time, and the periodic process management unit 214 manages the periodic process in the association with the calculated execution scheduled date with respect to each user. The display controller 215 displays a screen for executing the periodic process associated with the user and the execution scheduled date to the user on the operation and display unit 10 for a given term including the execution scheduled date based on information that the periodic process management unit 214 manages.

There are image forming apparatuses where the processes which are frequently used can be registered. However, it is necessary for a user to register the processes which are frequently used in even such image forming apparatus. Moreover, when executing the registered processes, the user needs to call the registered process by operating an operation screen. According to the above exemplary embodiment, the process that a user executes periodically is automatically registered in the periodic process management unit 214. Moreover, when the image forming apparatus is used by a user during a given term including an execution scheduled date, the periodic process execution proposal screen which allows the execution of the periodic process is presented. The given term including an execution scheduled date may be plus or minus M days of an execution scheduled date or plus M days or minus N days of an execution scheduled date (M is different from N). When the user executes the periodic process, the user may execute the periodic process through the periodic process execution proposal screen, and when the user does not execute the periodic process, the user may execute process through a normal operation screen. Accordingly, the number of processes that the user executes in executing the periodic process is reduced compared to an image forming apparatus which is not provided with the composition of the above exemplary embodiment. Moreover, the user convenience in accordance with the execution of the periodic process is improved compared to an image forming apparatus to which the composition of the above exemplary embodiment is not provided.

The periodic process execution proposal screen may be displayed when the image forming apparatus is used by a user after a given term including the execution scheduled date passes.

Moreover, according to the above exemplary embodiment, it is determined whether the executed process is the periodic process every time the user executes the process in the image forming apparatus 100. According to this, even when a new periodic routine task is assigned to the user, the periodic process corresponding to the new routine task is registered without forcing a user a special operation.

In the above exemplary embodiment, the setting information of the periodic process which is proposed on the periodic process execution proposal screen is determined based on the history information. Accordingly, the setting information which was used in the previous process is proposed as the setting information of the periodic process.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

Figure 11A:
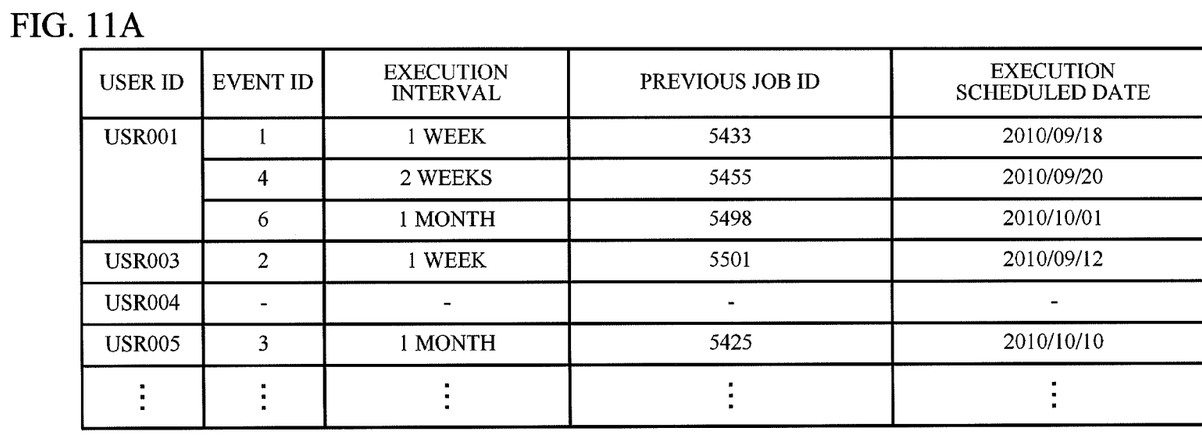
FIGS. 11A and 11B are diagrams illustrating another example of information stored in the periodic process management unit.

For example, in the above exemplary embodiment, the periodic process management unit 214 manages the periodic process which is executed periodically in association with the execution scheduled date when the periodic process is executed next time with respect to each user by using the user management table and the event management table. However, the periodic process management unit 214 may manage the periodic process of each user by using the table made by combining the user management table and the event management table as illustrated in FIG. 11A.

Figure 11B:
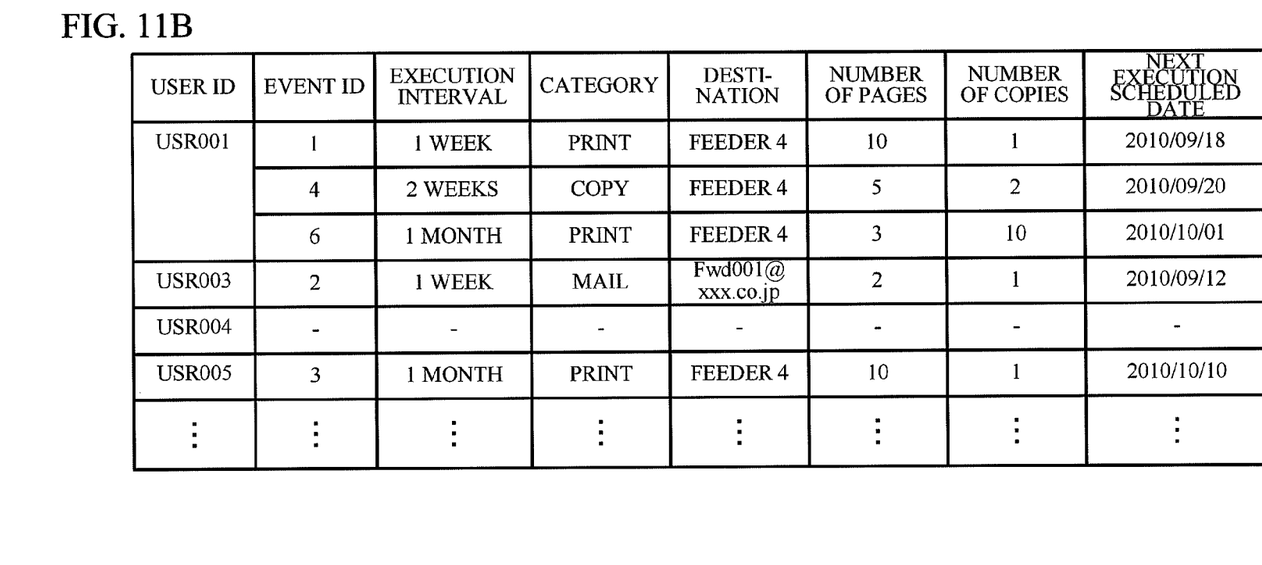

In the above exemplary embodiment, the setting information of the periodic process which is proposed on the periodic process execution proposal screen is acquired from the process identified by the "previous job ID". However, as illustrated in FIG. 11B, each value of the setting information may be stored with respect to each periodic process instead of the previous job ID. In this case, the setting information specified in the previous process may be stored in the item of each setting information, or the average value of set values or setting information which is used most may be stored based on the history information of each process. Accordingly, the setting information which is frequently used is proposed to the user as the setting information of the periodic process.

The functions provided to the controller 20 in the above exemplary embodiments can be achieved by a computer provided with a CPU, a ROM, a RAM and the like. In that case, programs where the process of the function that the controller 20 has is written are provided. The process function described above can be implemented to the computer by executing programs by the computer. Programs where the content of the process is written can be stored in the computer readable medium.

Programs are distributed in a transportable recording medium such as DVDs (Digital Versatile Disc) and CD-ROMs (Compact Disc Read Only Memory) in which programs are recorded. Programs can be stored in a storage device of a server computer, and be transferred to other computers from the server computer via a network.

The computer executing programs stores programs recoded in the transportable recoding medium or programs transferred from the server computer to its storage device. Then, the computer reads a program from its storage device, and executes the process according to the program. The computer can read a program from the transportable recording medium directly and executes the process according to the program. The computer can executes a process according to a program that the computer receives every time when the program is transferred from the server computer.

What is claimed is:

1. A device comprising:
a history storage unit configured to store history information, the history information associating information relating to a process executed in an image forming apparatus with user information that identifies a user who executed the process;
a periodic process determination unit configured to determine, by using the history information, whether the process executed by the user is a periodic process executed periodically;
an execution schedule calculation unit configured to calculate, in response to determining that the process executed by the user is a periodic process, a scheduled execution date when the periodic process is expected to be executed again;
a periodic process management unit configured to manage the periodic process in association with the user and the calculated scheduled execution date; and
a display controller configured to allow an execution of the periodic process from a display in response to the user using the image forming apparatus during a given term including the scheduled execution date.

2. The user interface device according to claim 1, wherein a content of the periodic process managed by the periodic process management unit is determined based on the content of the process stored in the history information.

3. A user interface device comprising:
a history storage unit configured to store history information, the history information associating information relating to a process executed in an image forming apparatus with user information that identifies a user who executed the process;
a periodic process determination unit configured to determine, by using the history information, whether the process executed by the user is a periodic process executed periodically;
an execution schedule calculation unit configured to calculate, in response to the periodic process determination unit determining that the process executed by the user is the periodic process, a scheduled execution date when the periodic process is expected to be executed again;
a periodic process management unit configured to manage the periodic process in association with the user and the calculated scheduled execution date; and
a display controller configured to allow an execution of the periodic process from a display in response to the user using the image forming apparatus during a given term including the scheduled execution date.

4. The user interface device according to claim 3, wherein a content of the periodic process managed by the periodic process management unit is determined based on the content of the process stored in the history information.

5. An image forming apparatus comprising:
a display that displays an operation screen that receives an operational input from a user; and
a display controller, wherein
the display controller includes:
- a history storage unit configured to store history information, the history information associating information relating to a process executed in an image forming apparatus with user information that identifies a user who executed the process;
- a periodic process determination unit configured to determine, by using the history information, whether the process executed by the user is a periodic process executed periodically;
- an execution schedule calculation unit configured to calculate, in response to the periodic process determination unit determining that the process executed by the user is the periodic process, a scheduled execution date when the periodic process is expected to be executed again; and
- a periodic process management unit configured to manage the periodic process in association with the user and the calculated scheduled execution data, and wherein the display controller is configured to allow an execution of the periodic process from the display in response to the user using the image forming apparatus during a given term including the scheduled execution date.

6. A non-transistory computer readable medium storing a program causing a computer to execute a process, the process comprising:
- determining whether a process executed by a user is a periodic process executed periodically on a basis of history information, which is stored in a storage device and associates information relating to a process executed in an image forming apparatus with user information that identifies a user who executed the process;
- calculating, in response to determining that the process executed by the user is the periodic process, a scheduled execution date when the periodic process is expected to be executed again;
- storing the periodic process in a storage device in association with the user and the calculated scheduled execution date; and
- displaying a screen that allows an execution of the periodic process in response to the user using the image forming apparatus during a given term including the scheduled execution date.

* * * * *